United States Patent
Tamai et al.

(10) Patent No.: US 11,495,800 B2
(45) Date of Patent: Nov. 8, 2022

(54) ELECTRODE FOR POWER STORAGE DEVICE AND METHOD FOR PRODUCING SAME

(71) Applicant: NEC CORPORATION, Tokyo (JP)

(72) Inventors: Suguru Tamai, Tokyo (JP); Hitoshi Ishikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 209 days.

(21) Appl. No.: 16/643,364

(22) PCT Filed: Aug. 14, 2018

(86) PCT No.: PCT/JP2018/030262
§ 371 (c)(1),
(2) Date: Feb. 28, 2020

(87) PCT Pub. No.: WO2019/044491
PCT Pub. Date: Mar. 7, 2019

(65) Prior Publication Data
US 2020/0365899 A1    Nov. 19, 2020

(30) Foreign Application Priority Data
Aug. 31, 2017   (JP) .............................. JP2017-166399

(51) Int. Cl.
*H01M 4/62* (2006.01)
*H01M 4/134* (2010.01)
(Continued)

(52) U.S. Cl.
CPC ........... *H01M 4/622* (2013.01); *H01M 4/134* (2013.01); *H01M 4/1395* (2013.01); *H01M 4/38* (2013.01);
(Continued)

(58) Field of Classification Search
None
See application file for complete search history.

(56) References Cited

U.S. PATENT DOCUMENTS

| 2010/0129704 A1 | 5/2010 | Luo et al. |
| 2015/0147627 A1 | 5/2015 | Takano |

(Continued)

FOREIGN PATENT DOCUMENTS

| CN | 102842734 A | 12/2012 |
| CN | 104241682 A | 12/2014 |

(Continued)

OTHER PUBLICATIONS

Machine translation of JP2016066529 (Year: 2016).*
(Continued)

*Primary Examiner* — Wyatt P McConnell
(74) *Attorney, Agent, or Firm* — Sughrue Mion, PLLC

(57) ABSTRACT

An object of the present invention is to provide a lithium ion secondary battery having a high energy density and improved cycle characteristics. The present invention is related to an electrode for a power storage device comprising a negative electrode mixture layer comprising: (a) a negative electrode active material (42-2) comprising 1% or more of a material comprising Si as a constituent element; (b) a first polymer (42-1) coating the negative electrode active material and comprising vinylidene fluoride as a monomer unit; and (c) a negative electrode binder (42-3) comprising a second polymer that has a molecular weight of 80,000 or more and comprises at least one monomer unit selected from the group consisting of acrylic acid, acrylate salt, methacrylic acid, and methacrylate salt.

6 Claims, 2 Drawing Sheets

(51) Int. Cl.
*H01M 4/1395* (2010.01)
*H01M 4/38* (2006.01)
*H01M 10/0525* (2010.01)
*H01M 4/02* (2006.01)

(52) U.S. Cl.
CPC .. *H01M 10/0525* (2013.01); *H01M 2004/027* (2013.01); *H01M 2220/20* (2013.01)

(56) References Cited

U.S. PATENT DOCUMENTS

2017/0149057 A1  5/2017  Sugita et al.
2018/0151882 A1  5/2018  Shimanuki et al.

FOREIGN PATENT DOCUMENTS

| CN | 104981923 A | 10/2015 |
|---|---|---|
| JP | 2007-019032 A | 1/2007 |
| JP | 2012-510142 A | 4/2012 |
| JP | 2013-191578 A | 9/2013 |
| JP | 5412705 B2 | 2/2014 |
| JP | 2015-103404 A | 6/2015 |
| JP | 2016-024934 A | 2/2016 |
| JP | 2016-042408 A | 3/2016 |
| JP | 2016-66529 A | 4/2016 |
| WO | 2016/194733 A1 | 12/2016 |

OTHER PUBLICATIONS

International Search Report for PCT/JP2018/030262 dated Nov. 6, 2018 (PCT/ISA/210).
Japanese Office Action for JP Application No. 2019-539333 dated Feb. 24, 2021 with English Translation.
Chinese Office Action for CN Application No. 201880055794.8 dated Aug. 2, 2022 with English Translation.

* cited by examiner

ELECTRODE FOR POWER STORAGE DEVICE AND METHOD FOR PRODUCING SAME

CROSS REFERENCE TO RELATED APPLICATIONS

This application is a National Stage of International Application No. PCT/JP2018/030262 filed Aug. 14, 2018, claiming priority based on Japanese Patent Application No. 2017-166399, filed Aug. 31, 2017, the disclosures of which are incorporated herein in their entirety by reference.

TECHNICAL FIELD

The present invention relates to an electrode for a power storage device and a method for producing the same, and more particularly, relates to an electrode having excellent life characteristics and a method for producing the same.

BACKGROUND ART

Lithium-ion batteries are widely used as power sources for small electronic devices such as mobile phones and notebook computers, and recently, these batteris have also attracted attention as large-scale power sources for power storage and automobile power sources. With the expansion of such uses, further improvement in energy density is desired for lithium-ion secondary batteries. In order to increase the energy density of a battery, using a Si material with a large absorbing/desorbing amount of lithium ions per unit volume for a negative electrode has been studied.

Patent Document 1 describes that by using a carbonate having a fluorine atom in an electrolyte solution with a negative electrode using a Si material, the decomposition of the electrolyte solution can be suppressed and the capacity retention rate of a battery can be improved.

Patent Document 2 describes that by using a specific binder as a binder with a negative electrode active material using a Si material, the decrease in electrode performance can be suppressed, and the capacity retention of a battery can be improved.

Patent Documents 3 and 4 describe that by coating a negative electrode active material using a Si material with PVDF, the decomposition of an electrolyte solution can be suppressed and the capacity retention of a battery can be improved.

CITATION LIST

Patent Document

Patent Document 1: Japanese Patent No. 5412705
Patent Document 2: Japanese Patent Laid-Open Publication No. 2012-510142
Patent Document 3: Japanese Patent Laid-Open Publication No. 2013-191578
Patent Document 4: Japanese Patent Laid-Open Publication No. 2016-024934

SUMMARY OF INVENTION

Technical Problem

It is known that Si materials have large expansion and contraction during charge and discharge. Therefore, there has been a problem in that when the electrode strength is low, the electrode layer is broken during the charge and discharge, leading to the degradation of electrode performance. In addition, since a new active material surface is exposed during the charge and discharge, there has been a problem in that decomposition of the electrolyte solution occurs on the active material surface. However, with the techniques described in Patent Documents 1 to 4, sufficient life characteristics could not be obtained.

In the technique disclosed in Patent Document 1, low electrode strength has not been improved. The technique disclosed in Patent Document 2 had a problem in that the bindability of the binder was significantly reduced during manufacturing the electrode, which caused the decrease in electrode strength. For these reasons, deterioration in electrode performance during charge and discharge could not be sufficiently suppressed.

In Patent Documents 3 and 4, due to the low-temperature heat treatment during manufacturing the electrode, the active material could not be sufficiently covered with PVDF, and the suppression of the decomposition of the electrolyte solution on the active material surface was insufficient. In addition, the electrode strength was low, and deterioration in electrode performance could not be sufficiently suppressed.

An object of one example embodiment of the present invention is to provide a lithium ion secondary battery having a high energy density and improved cycle characteristics.

Solution to Problem

The electrode for a power storage device according to the present invention is characterized in that it comprises a negative electrode mixture layer comprising: a negative electrode active material comprising 1% or more of a material comprising Si as a constituent element; a first polymer coating the negative electrode active material and comprising vinylidene fluoride as a monomer unit; and a negative electrode binder which comprises a second polymer with a molecular weight of 80,000 or more comprising at least one monomer unit selected from the group consisting of acrylic acid, acrylate salt, methacrylic acid, and methacrylate salt.

Advantageous Effect of Invention

According to the present invention, in a secondary battery having a negative electrode comprising a material containing Si as a constituent element, it is possible to obtain a lithium ion secondary battery in which the decomposition of an electrolyte solution and deterioration of electrode performance are suppressed and life characteristics are excellent.

DESCRIPTION OF EMBODIMENTS

Figure 1A:
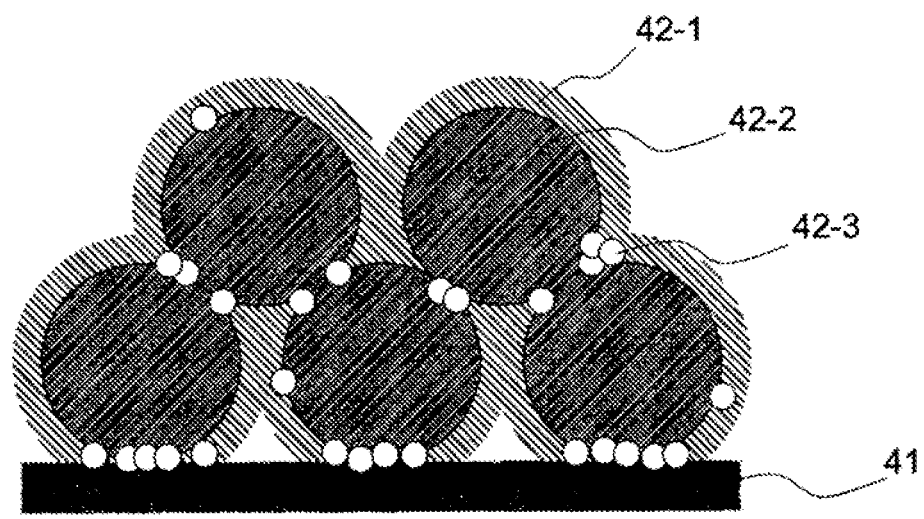
FIG. 1A is a sectional view schematically showing a basic structure of a negative electrode.

The electrode for a power storage device according to the present example embodiment comprises a negative electrode mixture layer comprising: (a) a negative electrode active material comprising 1% or more of a material comprising Si as a constituent element, (b) a first polymer coating the negative electrode active material and comprising vinylidene fluoride as a monomer unit, and (c) a negative electrode binder comprising a second polymer that has a molecular weight of 80,000 or more and comprises at least one monomer unit selected from the group consisting of acrylic acid, acrylate salt, methacrylic acid, and methacrylate salt.

Hereinafter, as an example of a secondary battery in which the electrode for a power storage device of the present example embodiment is used, a lithium ion secondary battery will be used as an example and described in detail for each component thereof. The electrode for a power storage device of the present example embodiment can be used for a lithium ion capacitor, an electric double layer capacitor, or the like, and is most preferably used for a lithium ion secondary battery. An example of the electrode for a power storage device of the present example embodiment will be described in the section <Negative electrode>.

<Positive Electrode>

The positive electrode may have a structure in which a positive electrode active material layer comprising a positive electrode active material is formed on a current collector. A positive electrode of the present example embodiment comprises, for example, a positive electrode current collector formed of a metal foil, and a positive electrode active material layer formed on one side or both sides of the positive electrode current collector. The positive electrode active material layer is formed so as to cover the positive electrode collector with a positive electrode binder. The positive electrode current collector is arranged to have an extended portion connected to a positive electrode terminal, and the positive electrode active material layer is not formed on the extended portion.

The positive electrode active material in the present example embodiment is not particularly limited as long as the material can absorb and desorb lithium, and may be selected from several viewpoints. From the viewpoint of achieving higher energy density, a high capacity compound is preferably contained. Examples of the high capacity compound include Li-rich layered positive electrode, lithium nickelate ($LiNiO_2$), and a lithium nickel composite oxide in which a part of the Ni of lithium nickelate is replaced by another metal element, and a Li-rich layered positive electrode represented by the following formula (A1) and a layered lithium nickel composite oxide represented by the following formula (A2) are preferred.

$$Li(Li_xM_{1-x-z}Mn_z)O_2 \quad (A1)$$

wherein in formula (A1), $0.1 \leq x < 0.3$, $0.4 \leq z \leq 0.8$, M is at least one of Ni, Co, Fe, Ti, Al, and Mg;

$$Li_yNi_{(1-x)}M_xO_2 \quad (A2)$$

wherein in formula (A2), $0 \leq x < 1$, $0 < y \leq 1$, M is at least one element selected from the group consisting of Li, Co, Al, Mn, Fe, Ti, and B.

From the viewpoint of high capacity, it is preferred that the content of Ni is high, that is, x is less than 0.5, further preferably x is 0.4 or less in the formula (A2). Examples of such compounds include $Li_\alpha Ni_\beta Co_\gamma Mn_\delta O_2$ ($0 < \alpha \leq 1.2$, preferably $1 \leq \alpha \leq 1.2$, $\alpha+\beta+\gamma+\delta=2$, $\beta \geq 0.7$, and $\gamma \leq 0.2$) and $Li_\alpha Ni_\beta Co_\gamma Al_\delta O_2$ ($0 < \alpha \leq 1.2$, preferably $1 \leq \alpha \leq 1.2$, $\alpha+\beta+\gamma+\delta=2$, $\beta \geq 0.6$, preferably $\beta \geq 0.7$, and $\gamma \leq 0.2$), and particularly include $LiNi_\beta Co_\gamma Mn_\delta O_2$ ($0.75 \leq \beta \leq 0.85$, $0.05 \leq \gamma \leq 0.15$, and $0.10 \leq \delta \leq 0.20$, $\beta+\gamma+\delta=1$). More specifically, for example, $LiNi_{0.8}Co_{0.05}Mn_{0.15}O_2$, $LiNi_{0.8}Co_{0.1}Mn_{0.1}O_2$, $LiNi_{0.8}Co_{0.15}Al_{0.05}O_2$, and $LiNi_{0.8}Co_{0.1}Al_{0.1}O_2$ may be preferably used.

From the viewpoint of thermal stability, it is also preferred that the content of Ni does not exceed 0.5, that is, x is 0.5 or more in the formula (A2). In addition, it is also preferred that particular transition metals do not exceed half. Examples of such compounds include $Li_\alpha Ni_\beta Co_\gamma Mn_\delta O_2$ ($0 < \alpha \leq 1.2$, preferably $1 \leq \alpha \leq 1.2$, $\alpha+\beta+\gamma+\delta=2$, $0.2 \leq \beta \leq 0.5$, $0.1 \gamma \leq 0.4$, and $0.1 \leq \delta \leq 0.4$). More specific examples may include $LiNi_{0.4}Co_{0.3}Mn_{0.3}O_2$ (abbreviated as NCM433), $LiNi_{1/3}Co_{1/3}Mn_{1/3}O_2$, $LiNi_{0.5}Co_{0.2}Mn_{0.3}O_2$ (abbreviated as NCM523), and $LiNi_{0.5}Co_{0.3}Mn_{0.2}O_2$ (abbreviated as NCM532) (also including those in which the content of each transition metal fluctuates by about 10% in these compounds).

In addition, two or more compounds represented by the formula (A2) may be mixed and used, and, for example, it is also preferred that NCM532 or NCM523 and NCM433 are mixed in the range of 9:1 to 1:9 (as a typical example, 2:1) and used. Further, by mixing a material in which the content of Ni in formula (A2) is high (x is 0.4 or less) and a material in which the content of Ni in formula (A2) does not exceed 0.5 (x is 0.5 or more, for example, NCM433), a battery having high capacity and high thermal stability can also be formed.

As the positive electrode active material other than the above, for example, lithium manganates having a layered structure or a spinel structure, such as $LiMnO_2$, $Li_xMn_2O_4$ ($0<x<2$), $Li_2MnO_3$, and $Li_xMn_{1.5}Ni_{0.5}O_4$ ($0<x<2$); $LiCoO_2$, or materials in which a part of such transition metals is substituted with other metal(s); materials having Li in an excessive amount as compared with the stoichiometric composition in these lithium transition metal oxides; and materials having an olivine structure such as $LiFePO_4$ may be exemplified. Further, materials obtained by substituting a part of these metal oxides with Al, Fe, P, Ti, Si, Pb, Sn, In, Bi, Ag, Ba, Ca, Hg, Pd, Pt, Te, Zn, La, or the like may also be used. Such positive electrode active materials described above may be used alone, or in combination of two or more thereof.

In one aspect of the present example embodiment, a positive electrode active material having a spinel structure which operates at a potential of 4.5V or more versus lithium is preferable, and a positive electrode active material represented by the following formula (B) is exemplified.

$$Li_a(M_xMn_{2-x-y}Y_y)(O_{4-w}Z_w) \quad (B)$$

wherein in formula (B), $0.4 \leq x \leq 1.2$, $0 \leq y$, $x+y<2$, $0 \leq a \leq 1.2$, preferably $0<a \leq 1.2$, $0 \leq w \leq 1$. M is a transition metal element and comprises at least one selected from the group consisting of Co, Ni, Fe, Cr and Cu, Y is a metal element and comprises at least one selected from the group consisting of Li, B, Na, Al, Mg, Ti, Si, K and Ca, and Z is at least one selected from the group consisting of F and Cl.

The positive electrode binder is not particularly limited, and polyvinylidene fluoride, vinylidene fluoride-hexafluoropropylene copolymer, vinylidene fluoride-tetrafluoroethylene copolymer, polytetrafluoroethylene, polypropylene, polyethylene, polybutadiene, polyacrylic acid, polyacrylate ester, polystyrene, polyacrylonitrile, polyimide, polyamide-imide and the like may be used. Also, the positive electrode binder may be a mixture, a copolymer or a cross-linked body of a plurality of the above resins, for example, styrene butadiene rubber (SBR). When an aqueous binder such as an SBR emulsion is used, a thickener such as carboxymethyl cellulose (CMC) may also be used.

The lower limit of the amount of the positive electrode binder is preferably 1 part by mass or more, and more preferably 2 parts by mass or more, and the upper limit is preferably 30 parts by mass or less, and more preferably 25 parts by mass or less, based on 100 parts by mass of the positive electrode active material.

The positive electrode current collector is not particularly limited, but aluminum, nickel, silver, or alloys thereof can be used. Examples of the shape of the positive electrode collector include foil, a flat plate shape, and a mesh shape, for example.

When producing a positive electrode, an conductive assisting agent may be added for the purpose of reducing the impedance. Examples of the conductive assisting agent include a carbonaceous fine particle such as graphite, carbon black, and acetylene black.

The positive electrode according to the present example embodiment may be prepared by preparing a slurry comprising the positive electrode active material, the binder and a solvent, and applying this slurry on the positive electrode current collector to form the positive electrode active mixture layer.

<Negative Electrode>

The negative electrode comprises a current collector and a negative electrode mixture layer provided on the current collector. The negative electrode mixture layer comprises a negative electrode active material coated with a first polymer (i.e., a polymer comprising vinylidene fluoride as a monomer unit), a second polymer as a negative electrode binder, and as necessary, an conductive assisting agent.

(Negative Electrode Active Material)

The negative electrode active material comprises a material comprising silicon as a constituent element (hereinafter, also referred to as a "silicon material"). Examples of the silicon material include a metal silicon (elemental silicon), an alloy comprising silicon, and a silicon oxide represented by the formula: $SiO_x$ ($0<x\leq2$), and the silicon material preferably comprises a silicon oxide (also referred to as "Si oxide"). The negative electrode active material is a material capable of absorbing and desorbing lithium. In the present specification, a substance that does not absorb and desorb lithium, such as a binder, is not included in the negative electrode active material.

The alloy comprising silicon may be an alloy of silicon and a metal other than silicon (non-silicon metal), and for example, an alloy of silicon and at least one selected from the group consisting of Li, B, Al, Ti, Fe, Pb, Sn, In, Bi, Ag, Ba, Ca, Hg, Pd, Pt, Te, Zn, La and Ni is preferable, and an alloy of silicon and at least one selected from the group consisting of Li, B, Ti, Fe and Ni is more preferable. The content of non-silicon metal in the alloy of silicon and a non-silicon metal is not particularly limited, but is preferably 0.1 to 5 mass %, for example. Examples of the method for producing the alloy of silicon and a non-silicon metal include a method of mixing and melting elemental silicon and a non-silicon metal, and a method of coating the surface of elemental silicon with a non-silicon metal by vapor deposition or the like.

Part or all of the surface of silicon and a silicon alloy may be coated with silicon oxide.

The silicon material comprised in the negative electrode active material may be one kind or two or more kinds.

The content of the silicon material is not particularly limited, but is for example 1 mass % or more, preferably 5 mass % or more, more preferably 50 mass % or more, still more preferably 70 mass % or more, and may be 100 mass %, based on the total amount of the negative electrode active material. When the content of the silicon material is within the above range, the energy density of the lithium ion secondary battery is improved and cycle characteristics can also be improved.

The shape of the active material is not particularly limited, and the active material may be formed as a layer on a negative electrode by vapor deposition or the like, but preferably, the active material has a particulate shape, and the particle size of the silicon material is preferably 0.1 µm or more and 50 µm or less, and more preferably 0.2 µm or more and 20 µm or less. When the particle size is too small, reactivity with an electrolyte solution or the like becomes higher, and thereby life characteristics may be deteriorated. When the particle size is too large, cracks of the particles easily occur during absorbing and desorbing Li, and thereby the life-span may be reduced.

The negative electrode active material may comprise other negative electrode active material(s) in addition to the silicon material. Examples of such other negative electrode active materials include carbon materials or the like.

It is preferable that the negative electrode active material comprises carbon in addition to the silicon material. By using a silicon material together with carbon, the influence of expansion and contraction of silicon material during absorbing and desorbing lithium ions can be reduced, and cycle characteristics of the battery can be improved. The silicon material and carbon may be mixed and used, and the surface of the silicon material may be coated with carbon to be used. Examples of carbon include graphite, amorphous carbon, graphene, diamond-like carbon, carbon nanotubes, and composites thereof. Here, graphite, which has high crystallinity, has high electric conductivity, excellent adhesiveness to an electrode collector formed of a metal such as copper, and excellent voltage flatness. In contrast, since amorphous carbon, which has low crystallinity, is relatively low in volume expansion, it is highly effective to reduce volume expansion of the entire negative electrode, and in addition, deterioration due to non-uniformity such as crystal grain boundary and defect hardly occurs. On the other hand, when the amount of the mixed carbon is too large, the capacity of the battery decreases. Although the content of the carbon material in the negative electrode active material is not particularly limited, 1 mass % or more is preferable and 5 mass % or more is preferable, and 70 mass % or less is preferable and 50 mass % or less is more preferable.

The first polymer for coating the negative electrode active material is not limited as long as it is a polymer comprising vinylidene fluoride as a monomer unit, and may include a homopolymer of vinylidene fluoride, and a copolymer of vinylidene fluoride and other monomer unit(s). The vinylidene fluoride unit in the copolymer is usually at least 50% (in mole ratio of monomer units) or more, preferably at least 70% or more. Examples of the comonomer include olefins such as ethylene and propylene, fluorinated olefins such as tetrafluoroethylene and hexafluoropropylene, and perfluoroalkyl vinyl ether and the like.

Examples of the preferred first polymer may include polyvinylidene fluoride, vinylidene fluoride-hexafluoropropylene copolymer, vinylidene fluoride-tetrafluoroethylene copolymer.

The lower limit of the first polymer is preferably 2 parts by mass or more, more preferably 4 parts by mass or more, based on 100 parts by mass of the negative electrode active material. Although even a partial coating can provide an effect, and higher coverage can provide better cycle characteristics, when the amount of the mixed first polymer is too large, the capacity of the battery may decrease. Therefore, the amount of the first polymer is usually 20 parts by mass or less, preferably 10 parts by mass or less, more preferably 7 parts by mass or less, based on 100 parts by mass of the negative electrode active material.

The second polymer is preferably polyacrylic acid comprising a (meth)acrylic acid monomer unit represented by the following formula (11) and/or a salt thereof. In the present specification, the term "(meth)acrylic acid" means acrylic acid and methacrylic acid.

(11)

wherein in formula (11), $R_1$ is a hydrogen atom or a methyl group.

The carboxylic acid group in the monomer unit represented by the formula (11) may be a carboxylic acid salt such as a metal salt of carboxylic acid. The metal is preferably a monovalent metal. Examples of the monovalent metal include alkali metals (for example, Na, Li, K, Rb, Cs, Fr and the like) and noble metals (for example, Ag, Au, Cu and the like). When the polyacrylic acid comprises a carboxylic acid salt in at least a part of the monomer units, the adhesion to the constituent material of the electrode mixture layer can be further improved.

The polyacrylic acid may comprise other monomer units. When the polyacrylic acid further comprises monomer unit(s) other than the (meth)acrylic acid monomer unit, the peel strength between the electrode mixture layer and the current collector may be improved in some cases. Examples of such other monomer units include monomer units derived from a monomer including: acids having an ethylenically unsaturated group including monocarboxylic acid compounds such as crotonic acid and pentenoic acid, dicarboxylic acid compounds such as itaconic acid and maleic acid, sulfonic acid compounds such as vinyl sulfonic acid, and phosphonic acid compounds such as vinyl phosphonic acid; aromatic olefins having an acidic group such as styrene sulfonic acid and styrene carboxylic acid; alkyl (meth) acrylate esters; acrylonitrile; aliphatic olefins such as ethylene, propylene and butadiene; aromatic olefins encompassing aromatic vinyl such as styrene. Other monomer unit(s) may also be a monomer unit constituting a known polymer used as a binder for a secondary battery. Also in these monomer units, if present, the acid may be a salt.

Furthermore, in the polyacrylic acid, at least one hydrogen atom in the main chain and side chain may be substituted with halogen (fluorine, chlorine, boron, iodine and the like).

When the polyacrylic acid is a copolymer comprising two or more kinds of monomer units, the copolymer may be a random copolymer, an alternating copolymer, a block copolymer, a graft copolymer and the like, or a combination thereof.

The molecular weight (weight average) of the polyacrylic acid is more than 50,000, preferably 80,000 or more, more preferably 100,000 or more and 1,000,000 or less, and still more preferably 400,000 or more to 800,000 or less. In addition, the first polymer is preferably a copolymer comprising sodium acrylate and aromatic vinyl as monomer units, in which case a high electrode strength can be obtained even after the heat treatment.

Although an active material having a large specific surface area requires in general a large amount of a binder, polyacrylic acid provides a high bindability even in a small amount. Therefore, when polyacrylic acid is used as the negative electrode binder, the increase in resistance due to the binder is small even if the electrode uses an active material having a large specific surface area. Further, the binder comprising polyacrylic acid is superior in that the binder is able to reduce the irreversible capacity of the battery, increase the capacity of the battery, and improve the cycle characteristics.

The amount of the second polymer is preferably 3 parts by mass or more and 10 parts by mass or less based on 100 parts by mass of the negative electrode active material. As the negative electrode binder, other known binders and thickeners can also be used in addition to the second polymer. For example, a thickener such as carboxymethyl cellulose (CMC) can be used. The proportion of the second polymer (the proportion of the solid content) in the negative electrode binder is preferably 60% by mass or more, more preferably 80% by mass, further preferably 90% by mass or more, and may be 100% by mass.

As the negative electrode current collector, aluminum, nickel, copper, silver, and alloys thereof are preferable in view of electrochemical stability. Examples of the shape thereof may include foil, a flat plate shape, or mesh.

The negative electrode may additionally comprise an electrically conductive material for the purpose of reducing the impedance. Examples of the additional electrically conductive material include scaly or fibrous carbonaceous fine particles and the like, such as carbon black, acetylene black, ketjen black, vapor grown carbon fiber and the like.

Next, FIG. 1A schematically illustrates an example of the structure of the negative electrode (an electrode for a power storage device) of the present example embodiment. As shown in this figure, a negative electrode active material (42-2) is bound to each other with a second polymer (42-3) serving as a negative electrode binder, and is also bound to a current collector (41). In addition, the negative electrode active material (42-2) is coated with a first polymer (42-1).

The negative electrode according to the present example embodiment can be manufactured, for example, according to the following process.

Figure 1B:
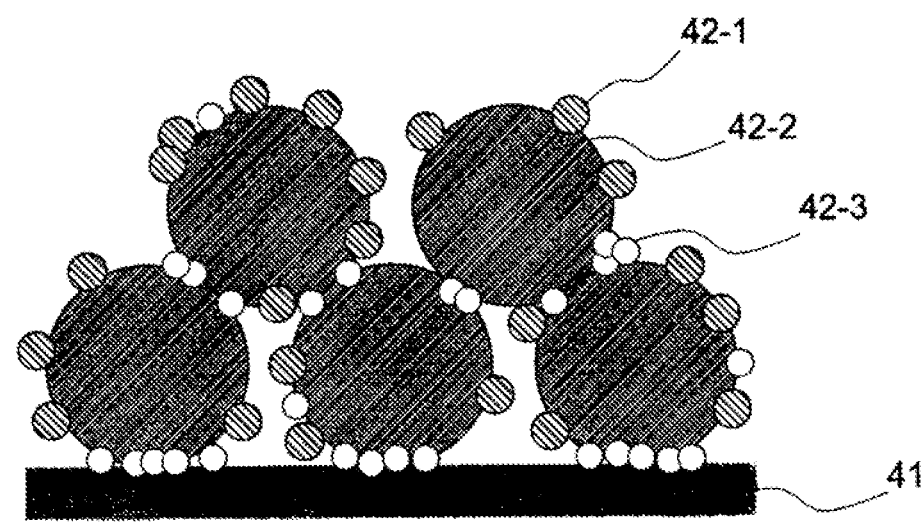
FIG. 1B is a sectional view schematically showing a structure of a negative electrode before heat treatment.

A mixture of a negative electrode active material, a first polymer, a second polymer, and optionally an electrically conductive material material is prepared and applied to a negative electrode current collector. The mixing and applying method may be a method in which a powder mixture is applied by a sputtering method or a CVD method, and it is preferable to prepare a slurry using a solution of NMP or the like or water, and apply the prepared slurry using a die method or a doctor blade method. In particular, when the slurry is prepared with water, since the first polymer does not dissolve, the second polymer will preferentially bind to the active material. FIG. 1B schematically shows a state where the slurry is applied to the negative electrode current collector (41) and dried. The second polymer (42-3) penetrates into between the negative electrode active materials (42-2) and between the negative electrode active material (42-2) and the current collector 41, and functions as a binder.

The applied electrode is dried prior to heat treatment. The heat treatment temperature is preferably 250° C. or higher, more preferably 300° C. or higher, and most preferably 350° C. or higher. The first polymer can form a film on the active material by the heat treatment. The temperature is preferably 500° C. or lower, more preferably 400° C. or lower. The time of the heat treatment can be appropriately selected, but is preferably 1 hour or more and 48 hours or less, for example, about 3 hours. The heat treatment is performed in an inert atmosphere, preferably in a nitrogen or argon atmosphere. The first polymer (42-1), which is present in a particulate state before the heat treatment as shown in FIG. 1B, will coat the negative electrode active material (42-2) after the heat treatment as shown in FIG. 1A. As will be shown in Examples described later, it is considered that the treatment at a high temperature allows the first polymer to adhere to and uniformly coat the active material, thereby improving the capacity retention rate. Further, the second polymer is presumed to be distributed and exist between the active material and the current collector and function as a binder.

<Electrolyte Solution>

The electrolyte solution of the lithium ion secondary battery according to the present example embodiment is not particularly limited, but is preferably a non-aqueous electrolyte solution containing a non-aqueous solvent and a supporting salt which are stable to operation potentials of the battery.

Examples of the non-aqueous solvent include aprotic organic solvents, for examples, cyclic carbonates such as propylene carbonate (PC), ethylene carbonate (EC) and butylene carbonate (BC); open-chain carbonates such as dimethyl carbonate (DMC), diethyl carbonate (DEC), ethyl methyl carbonate (EMC) and dipropyl carbonate (DPC); propylene carbonate derivatives, aliphatic carboxylic acid esters such as methyl formate, methyl acetate and ethyl propionate; ethers such as diethyl ether and ethyl propyl ether, phosphoric acid esters such as trimethyl phosphate, triethyl phosphate, tripropyl phosphate, trioctyl phosphate and triphenyl phosphate, and fluorinated aprotic organic solvents obtainable by substituting at least part of hydrogen atoms of these compounds with fluorine atom(s), and the like.

Among them, cyclic or open-chain carbonate(s) such as ethylene carbonate (EC), propylene carbonate (PC), butylene carbonate (BC), dimethyl carbonate (DMC), diethyl carbonate (DEC), ethyl methyl carbonate (MEC), dipropyl carbonate (DPC) or the like is preferably contained.

The non-aqueous solvents may be used alone, or in combination of two or more.

Examples of the supporting salt include lithium salts such as $LiPF_6$, $LiAsF_6$, $LiAlCl_4$, $LiClO_4$, $LiBF_4$, $LiSbF_6$, $LiCF_3SO_3$, $LiC_4F_9SO_3$, $LiC(CF_3SO_2)_3$, and $LiN(CF_3SO_2)_2$. The supporting salt may be used alone, or in combination of two or more. $LiPF_6$ is preferred in view of cost reduction.

The electrolyte solution may further comprises an additive. Examples of the additive include, but are not particularly limited to, halogenated cyclic carbonates, unsaturated cyclic carbonates, acid anhydrides, cyclic or open-chain disulfonic acid esters and the like. The addition of these compounds can improve battery properties such as the cycle characteristics. It is presumed that this is because these additives are decomposed during charge and discharge of the lithium ion secondary battery to form a film on the surface of the electrode active material and suppress decomposition of the electrolyte solution and the supporting salt.

<Separator>

The separator may be of any type as long as it suppresses electric conduction between the positive electrode and the negative electrode, does not inhibit the permeation of charged substances, and has durability against the electrolyte solution. Specific examples of the materials include polyolefins such as polypropylene and polyethylene, cellulose, polyethylene terephthalate, polyimide, polyvinylidene fluoride, and aromatic polyamides (aramid) such as polymetaphenylene isophthalamide, polyparaphenylene terephthalamide and copolyparaphenylene-3, 4'-oxydiphenylene terephthalamide, and the like. These may be used as a porous film, a woven fabric, a nonwoven fabric and the like.

<Insulation Layer>

An insulation layer may be formed on at least one surface of the positive electrode, the negative electrode and the separator. Examples of a method for forming the insulation layer include a doctor blade method, a dip coating method, a die coater method, a CVD method, a sputtering method and the like. The insulation layer may be formed at the same time as forming the positive electrode, the negative electrode, or the separator. Examples of materials constituting the insulation layer include a mixture of aluminum oxide, barium titanate or the like and SBR or PVDF.

<Structure of Lithium Ion Secondary Battery>

Figure 2:
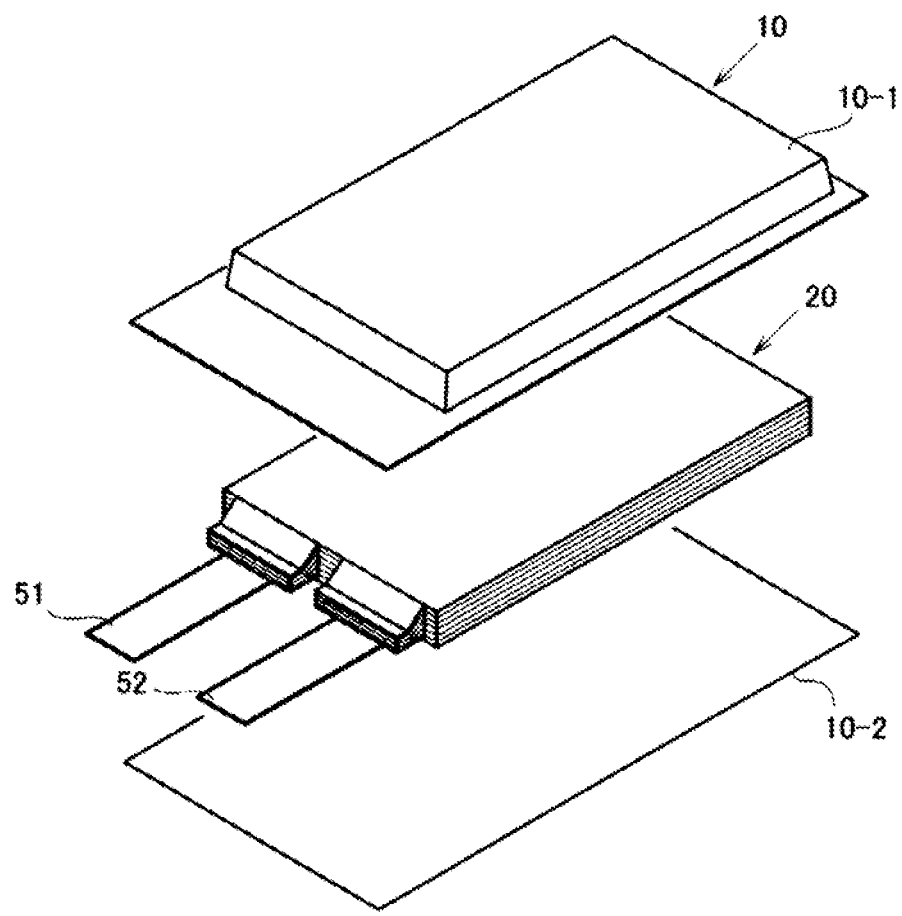
FIG. 2 is an exploded perspective view showing a basic structure of a film-packaged battery.
Figure 3:
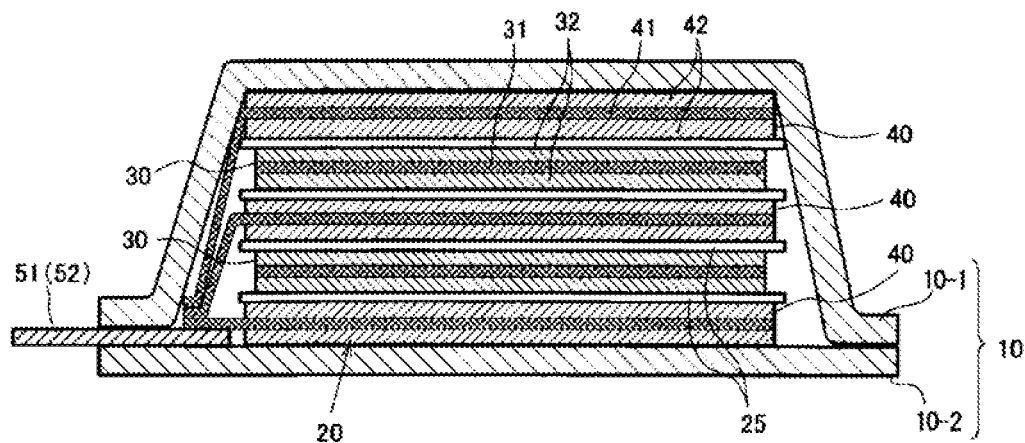
FIG. 3 is a sectional view schematically showing a section of the battery in FIG. 2.

The lithium ion secondary battery according to the present example embodiment may have, for example, a structure as shown in FIG. 2 and FIG. 3. This lithium ion secondary battery comprises a battery element 20, a film package 10 housing the battery element 20 together with an electrolyte, and a positive electrode tab 51 and a negative electrode tab 52 (hereinafter these are also simply referred to as "electrode tabs").

In the battery element 20, a plurality of positive electrodes 30 and a plurality of negative electrodes 40 are alternately stacked with separators 25 sandwiched therebetween as shown in FIG. 3. In the positive electrode 30, an electrode material 32 is applied to both surfaces of a metal foil 31, and also in the negative electrode 40, an electrode material 42 is applied to both surfaces of a metal foil 41 in the same manner. The present invention is not necessarily limited to stacking type batteries and may also be applied to batteries such as a winding type.

As shown in FIG. 2 and FIG. 3, the lithium ion secondary battery of the present example embodiment may have an arrangement in which the electrode tabs are drawn out to one side of the outer package, but in the lithium ion secondary battery, the electrode tab may be drawn out to both sides of the outer package. Although detailed illustration is omitted, the metal foils of the positive electrodes and the negative electrodes each have an extended portion in part of the outer periphery. The extended portions of the negative electrode metal foils are brought together into one and connected to the negative electrode tab 52, and the extended portions of the positive electrode metal foils are brought together into one and connected to the positive electrode tab 51 (see FIG. 3). The portion in which the extended portions are brought together into one in the stacking direction in this manner is also referred to as a "current collecting portion" or the like.

The film package 10 is composed of two films 10-1 and 10-2 in this example. The films 10-1 and 10-2 are heat-sealed to each other in the peripheral portion of the battery element 20 and hermetically sealed. In FIG. 2, the positive electrode tab 51 and the negative electrode tab 52 are drawn out in the same direction from one short side of the film package 10 hermetically sealed in this manner.

Of course, the electrode tabs may be drawn out from different two sides respectively. In addition, regarding the arrangement of the films, in FIG. 2 and FIG. 3, an example in which a cup portion is formed in one film 10-1 and a cup portion is not formed in the other film 10-2 is shown, but other than this, an arrangement in which cup portions are formed in both films (not illustrated), or an arrangement in which a cup portion is not formed in either film (not illustrated), and the like may also be adopted.

<Method for Manufacturing Lithium Ion Secondary Battery>

The lithium ion secondary battery according to the present example embodiment can be manufactured according to a conventional method. An example of a method for manufacturing a lithium ion secondary battery will be described using a stacked laminate type lithium ion secondary battery as an example. First, in the dry air or an inert atmosphere, the positive electrode and the negative electrode are placed to oppose to each other via a separator to form the electrode element. Next, this electrode element is accommodated in an outer package (container), an electrolyte solution is injected, and the electrode is impregnated with the electrolyte solution. Thereafter, the opening of the outer package is sealed to complete the lithium ion secondary battery.

<Assembled Battery>

A plurality of lithium ion secondary batteries according to the present example embodiment may be combined to form an assembled battery. The assembled battery may be configured, for example, by connecting two or more lithium ion secondary batteries according to the present example embodiment in series or in parallel or in combination of both. The connection in series and/or parallel makes it possible to adjust the capacity and voltage freely. The number of lithium ion secondary batteries included in the assembled battery can be set appropriately according to the battery capacity and output.

<Vehicle>

The lithium ion secondary battery or the assembled battery according to the present example embodiment can be used in vehicles. Examples of the vehicle according to the present example embodiment include hybrid vehicles, fuel cell vehicles, electric vehicles (all of which include, besides four-wheel vehicles (cars, trucks, commercial vehicles such as buses, light automobiles, etc.), two-wheeled vehicle (bike) and tricycle), and the like. The vehicles according to the present example embodiment is not limited to automobiles, they may be used as a variety of power source of other vehicles, such as a moving body like a train.

EXAMPLES

Example 1

<Negative Electrode>

As the negative electrode active material, artificial graphite and metal silicon (Si) were used, and PVdF (water dispersion) was used as the first polymer, and sodium polyacrylate (water dispersion) having a molecular weight of about 100,000 was used as the second polymer. These were measured and mixed so that the mass ratio of graphite/Si/film-forming agent/binder=83/10/4/3. The obtained slurry was applied to a copper foil having a thickness of 10 μm and then dried, and then heat treatment was conducted at 350° C. for 3 hours in a $N_2$ atmosphere to produce a negative electrode.

<Evaluation of Electrode Peel Strength>

The prepared negative electrode was cut into a strip shape having a width of 1 cm, and fixed to a fixing table using a double-sided adhesive tape. The current collector at the end of the fixed electrode was slightly peeled off with tweezers from the electrode mixture layer, and the peeled current collector portion was attached to a tensile tester. Thereafter, the tensile tester was operated to pull it to 90 degree to the fixing table at a constant speed, and the electrode strength at the time of peeling was determined from the stress applied at that time.

<Positive Electrode>

$LiNi_{0.8}Co_{0.15}Al_{0.05}O_2$ was used as the positive electrode active material. This positive electrode active material, carbon black as an electrically conductive material and polyvinylidene fluoride as a positive electrode binder were weighed at a mass ratio of 90:5:5. These were mixed with N-methylpyrrolidone to prepare a positive electrode slurry. The positive electrode slurry was applied to a 20 μm-thick aluminum foil, then dried and further pressed to produce a positive electrode.

<Electrode Stack>

The obtained three layers of the positive electrodes and four layers of the negative electrodes were stacked alternately with an PET non-woven fabric as a separator sandwiched therebetween. The end portions of the positive electrode current collectors that were not covered with the positive electrode active material and the end portions of the negative electrode current collectors that were not covered with the negative electrode active material were welded individually. Further, to the welded positions, an aluminum positive electrode terminal and a nickel negative electrode terminal were welded respectively, to obtain an electrode stack having a planar stacked structure.

<Electrolyte Solution>

To a solvent obtained by mixing ethylene carbonate (EC) and diethyl carbonate (DEC) at a blending ratio of EC/DEC=30/70 (volume ratio), $LiPF_6$ was added as a supporting salt to prepared an electrolyte solution having a supporting salt concentration of 1.0 mol/L.

<Injection>

The electrode stack was accommodated in an aluminum laminate film as an outer package, and then the electrolyte solution was injected inside the outer package. Thereafter, vacuum impregnation (pressure: 10 kPa (abs)) was performed in a chamber, and the outer package was sealed to obtain a battery.

<Battery Evaluation>

A cycle test of the obtained battery was performed as follows. 50 cycles of CC-CV charge (upper limit voltage: 4.2 V, current: 1 C, CV time: 1.5 hours) and CC discharge (lower limit voltage: 3.0 V, current: 1 C) were both carried out at 45° C. The ratio of discharge capacity at 50th cycle to discharge capacity at 1st cycle was shown as capacity retention rate after the 50th cycle in Table 1.

Examples 2 to 9

Except that the negative electrode active material, the negative electrode binder, the negative electrode composition, and the treatment temperature were changed as described in Table 1, lithium ion secondary batteries were prepared in the same manner as in Example 1, and the peel strength evaluation of the negative electrode and the battery evaluation were performed in the same manner. The second polymer used as the negative electrode binder in Example 5 and Comparative Example 9 was a copolymer having a molecular weight of 500,000 and comprising sodium acrylate and styrene as monomer units.

Comparative Examples 1 to 16

Except that the negative electrode active material, the negative electrode binder, the negative electrode composition, and the treatment temperature were changed as described in Table 1, lithium ion secondary batteries were prepared in the same manner as in Example 1, and the peel strength evaluation of the negative electrode and the battery evaluation were performed in the same manner.

The negative electrode conditions, and results of the electrode peel strength and the battery evaluation of Examples 1 to 9 and Comparative Examples 1 to 17 are shown in Table 1 below.

TABLE 1

| | Negative electrode active material | Second polymer (molecular weight) | Negative electrode composition (graphite/Si material/first polymer/second polymer) | Treatment temperature | Electrode strength [mN/mm] | Retention rate [%] |
|---|---|---|---|---|---|---|
| Example 1 | graphite, metal Si | PAANa (100,000) | 83/10/4/3 | 350° C. | 10 | 80.5 |
| Example 2 | graphite, metal Si | PAANa (100,000) | 83/10/4/3 | 300° C. | 11 | 80.4 |
| Example 3 | graphite, metal Si | PAANa (100,000) | 83/10/4/3 | 250° C. | 12 | 78.8 |
| Comparative Example 1 | graphite, metal Si | PAANa (100,000) | 83/10/4/3 | 200° C. | 14 | 76.4 |
| Comparative Example 2 | graphite, metal Si | PAANa (100,000) | 83/10/4/3 | 150° C. | 14 | 75.2 |
| Comparative Example 3 | graphite, metal Si | PAANa (100,000) | 83/10/4/3 | NA | 15 | 75.0 |
| Comparative Example 4 | graphite, metal Si | — | 86/10/4/0 | 350° C. | 3 | 12.4 |
| Comparative Example 5 | graphite, metal Si | PAANa (100,000) | 84/10/4/2 | 350° C. | 5 | 47.5 |
| Comparative Example 6 | graphite, metal Si | PAANa (50,000) | 83/10/4/3 | 350° C. | 5 | 58.7 |
| Comparative Example 7 | graphite, metal Si | PAANa (50,000) | 83/10/4/3 | NA | 10 | 70.4 |
| Example 4 | graphite, metal Si | PAANa (500,000) | 83/10/4/3 | 350° C. | 25 | 81.0 |
| Comparative Example 8 | graphite, metal Si | PAANa (500,000) | 83/10/4/3 | NA | 30 | 75.8 |
| Example 5 | graphite, metal Si | copolymer (500,000) | 83/10/4/3 | 350° C. | 34 | 82.4 |
| Comparative Example 9 | graphite, metal Si | copolymer (500,000) | 83/10/4/3 | NA | 35 | 77.8 |
| Example 6 | graphite, metal Si | PAANa (100,000) | 85/10/2/3 | 350° C. | 10 | 75.7 |
| Comparative Example 10 | graphite, metal Si | PAANa (100,000) | 87/10/0/3 | 350° C. | 8 | 72.1 |
| Comparative Example 11 | graphite, metal Si | PAANa (100,000) | 83/10/0/7 | NA | 22 | 75.1 |
| Comparative Example 12 | graphite, metal Si | PAANa (100,000) | 93/0/4/3 | 350° C. | 18 | 90.7 |
| Comparative Example 13 | graphite, metal Si | PAANa (100,000) | 93/0/4/3 | NA | 22 | 92.4 |
| Example 7 | graphite, metal Si | PAANa (100,000) | 63/30/4/3 | 350° C. | 10 | 71.4 |
| Comparative Example 14 | graphite, metal Si | PAANa (100,000) | 63/30/4/3 | NA | 13 | 65.0 |
| Example 8 | graphite, metal Si | PAANa (100,000) | 23/70/4/3 | 350° C. | 10 | 58.4 |
| Comparative Example 15 | graphite, metal Si | PAANa (100,000) | 23/70/4/3 | NA | 13 | 47.0 |
| Example 9 | graphite, SiO | PAANa (100,000) | 23/70/4/3 | 350° C. | 18 | 88.9 |
| Comparative Example 16 | graphite, SiO | PAANa (100,000) | 23/70/4/3 | NA | 23 | 85.4 |

The following can be seen from Table 1:

(1) From the comparison between Example 1 and Comparative Example 4, the electrode peel strength is extremely decreased in Comparative Example 4 in which the second polymer (binder) is not used. On the other hand, in Comparative Example 10 in which the first polymer (the film-forming agent) is not used, the decrease in electrode peel strength is slight. Further, in Comparative Example 11 in which the amount of the second polymer is increased without using the first polymer, the electrode peel strength is greatly improved. From these, it can be understood that the function as a binder is carried out mainly by the second polymer.

(2) From the comparison of Example 1, Example 6, and Comparative Example 10, the first polymer contributes to the improvement of the retention rate.

(3) From the comparison of Examples 1 to 3 and Comparative Examples 1 to 3, the retention rate improves as the treatment temperature increases. It is considered that the adhesion and uniformity of the coating film of the first polymer to the negative electrode active material were improved.

(4) From Example 5, the electrode peel strength and the retention rate are improved when a polymer having a relatively high molecular weight is used as the second polymer.

Supplementary Notes

The whole or part of the example embodiments disclosed above can be described as, but not limited to, the following supplementary notes.

(Supplementary Note 1)

An electrode for a power storage device comprising a negative electrode mixture layer comprising:

(a) a negative electrode active material comprising 1% or more of a material comprising Si as a constituent element;

(b) a first polymer coating the negative electrode active material and comprising vinylidene fluoride as a monomer unit, and (c) a negative electrode binder comprising a second polymer that has a molecular weight of 80,000 or more and comprises at least one monomer unit selected from the group consisting of acrylic acid, acrylate salt, methacrylic acid, and methacrylate salt.

(Supplementary Note 2)

The electrode for a power storage device according to the supplementary note 1, wherein the second polymer is a polymer having a molecular weight of 400,000 or more.

(Supplementary Note 3)

The electrode for a power storage device according to the supplementary note 1 or 2, wherein the second polymer is a copolymer comprising sodium acrylate as a monomer.

(Supplementary Note 4)

The electrode for a power storage device according to the supplementary note 3, wherein the second polymer is a copolymer comprising sodium acrylate and aromatic vinyl as monomer units.

(Supplementary Note 5)

A method for producing an electrode for a power storage device, comprising:

applying a slurry on an electrode, wherein the slurry is obtained by mixing:

(a) a negative electrode active material comprising 1% or more of a material comprising Si as a constituent element;

(b) a first polymer coating the negative electrode active material and comprising vinylidene fluoride as a monomer unit, and (c) a negative electrode binder comprising a second polymer that has a molecular weight of 80,000 or more and comprises at least one monomer unit selected from the group consisting of acrylic acid, acrylate salt, methacrylic acid, and methacrylate salt; and then performing heat treatment at a temperature of 250° C. or higher.

(Supplementary Note 6)

The method for producing an electrode for a power storage device according to the supplementary note 5, wherein the heat treatment is performed at a temperature of 300° C. or higher.

(Supplementary Note 7)

The method for producing an electrode for a power storage device according to the supplementary note 5, wherein the heat treatment is performed at a temperature of 350° C. or higher.

(Supplementary Note 8)

The electrode for a power storage device according to any one of the supplementary notes 1 to 4, wherein the material comprising Si as a constituent element is a Si oxide represented by $SiO_x$ ($0<x\leq2$).

While the invention has been described with reference to example embodiments and examples thereof, the invention is not limited to the above example embodiments and examples. Various changes that can be understood by those skilled in the art may be made to the configuration and details of the invention within the scope of the present invention.

INDUSTRIAL APPLICABILITY

The electrode for a power storage device provided by the present invention can be used for lithium ion secondary batteries, lithium ion capacitors, electric double layer capacitors, and the like. The secondary battery using thereof can be utilized in various industrial fields that require for an electric power source and in an industrial field concerning transportation, storage and supply of electric energy. Specifically, it can be used for power sources of mobile devices, power sources of moving/transporting media, backup power sources, power storage facilities for storing power generated by solar power generation, wind power generation and the like.

EXPLANATION OF REFERENCE

10 film package
20 battery element
25 separator
30 positive electrode
40 negative electrode
41 negative electrode current collector
42-1 first polymer
42-2 negative electrode active material
42-3 second polymer

The invention claimed is:

1. An electrode for a power storage device comprising a negative electrode mixture layer comprising:
    (a) a negative electrode active material comprising 1% or more of a material comprising Si as a constituent element;
    (b) a first polymer coating the negative electrode active material and comprising vinylidene fluoride as a monomer unit; and
    (c) a negative electrode binder comprising a second polymer that has a molecular weight of 80,000 or more and comprises at least one monomer unit selected from the group consisting of acrylic acid, acrylate salt, methacrylic acid and methacrylate salt
    wherein an amount of the second polymer is from 3 parts by mass to 10 parts by mass based on 100 parts by mass of the negative electrode active material,
    wherein the second polymer is a copolymer comprising sodium acrylate as a monomer unit.

2. The electrode for a power storage device according to claim 1, wherein the second polymer is a polymer having a molecular weight of 400,000 or more.

3. The electrode for a power storage device according to claim 1, wherein the second polymer is a copolymer comprising sodium acrylate and aromatic vinyl as monomer units.

4. The electrode for a power storage device according to claim 1, wherein the material comprising Si as a constituent element is a Si oxide represented as $SiO_x$ ($0<x\leq2$).

5. An electrode for a power storage device comprising a negative electrode mixture layer comprising:
    (a) a negative electrode active material comprising 1% or more of a material comprising Si as a constituent element;
    (b) a first polymer coating the negative electrode active material and comprising vinylidene fluoride as a monomer unit; and
    (c) a negative electrode binder comprising a second polymer that has a molecular weight of 80,000 or more and comprises at least one monomer unit selected from the group consisting of acrylic acid, acrylate salt, methacrylic acid and methacrylate salt,
    wherein the second polymer is a copolymer comprising sodium acrylate as a monomer unit.

6. The electrode for a power storage device according to claim 5, wherein the second polymer is a copolymer comprising sodium acrylate and aromatic vinyl as monomer units.

* * * * *